US012338171B2

(12) United States Patent
Parmenter

(10) Patent No.: US 12,338,171 B2
(45) Date of Patent: Jun. 24, 2025

(54) SYSTEMS AND METHODS FOR SPRAYABLE HEMP-BASED COMPOSITIONS

(71) Applicant: Michigan Medical Hemp L.L.C., Chesaning, MI (US)

(72) Inventor: Beau Parmenter, Henderson, MI (US)

(73) Assignee: Michigan Medical Hemp LLC, Chesaning, MI (US)

( * ) Notice: Subject to any disclaimer, the term of this patent is extended or adjusted under 35 U.S.C. 154(b) by 225 days.

(21) Appl. No.: 18/065,158

(22) Filed: Dec. 13, 2022

(65) Prior Publication Data

US 2023/0110468 A1 Apr. 13, 2023

Related U.S. Application Data

(63) Continuation of application No. 17/206,954, filed on Mar. 19, 2021, now Pat. No. 11,548,820.

(60) Provisional application No. 62/992,539, filed on Mar. 20, 2020.

(51) Int. Cl.
| | |
|---|---|
| *C04B 16/02* | (2006.01) |
| *C04B 22/02* | (2006.01) |
| *C04B 28/04* | (2006.01) |
| *C04B 28/12* | (2006.01) |
| *E04C 1/41* | (2006.01) |
| *C04B 103/63* | (2006.01) |
| *C04B 111/00* | (2006.01) |

(52) U.S. Cl.
CPC .............. *C04B 16/02* (2013.01); *C04B 22/02* (2013.01); *C04B 28/04* (2013.01); *C04B 28/12* (2013.01); *E04C 1/41* (2013.01); *C04B 2103/63* (2013.01); *C04B 2111/00155* (2013.01); *C04B 2201/50* (2013.01); *E04B 2103/02* (2013.01)

(58) Field of Classification Search
CPC ................ C04B 28/12; C04B 2103/63; C04B 2111/00155; C04B 2201/50; E04C 1/41; E04B 2103/02
See application file for complete search history.

(56) References Cited

U.S. PATENT DOCUMENTS

| | | | | |
|---|---|---|---|---|
| 1,173,807 A | * | 2/1916 | Johnson | ..................... E02D 5/38 405/234 |
| 4,373,957 A | * | 2/1983 | Pedersen | .................. C04B 28/02 106/711 |
| 5,123,177 A | * | 6/1992 | Koetter | .................... F26B 21/02 34/92 |

(Continued)

FOREIGN PATENT DOCUMENTS

| | | |
|---|---|---|
| CN | 110682406 A | 1/2020 |
| EP | 2724996 A3 | 10/2017 |

(Continued)

OTHER PUBLICATIONS

Echemi_com https://www.echemi.com/cms/1701005.html#:~:text= The pH value on a,is quite a weak acid. (Year: 2024).*

(Continued)

*Primary Examiner* — Babajide A Demuren
(74) *Attorney, Agent, or Firm* — Gunther J. Evanina; BUTZEL

(57) ABSTRACT

Described herein are compositions comprising hemp, minerals, and water. Such compositions may be used in construction, building materials, insulation, etc. Such compositions may be sprayed, poured, cast, molded, etc.

25 Claims, 4 Drawing Sheets

(56) References Cited

U.S. PATENT DOCUMENTS

| | | | |
|---|---|---|---|
| 5,356,671 A * | 10/1994 | Drs | C04B 40/0039 |
| | | | 427/385.5 |
| 6,913,644 B2 | 7/2005 | Rizza | |
| 11,548,820 B2 * | 1/2023 | Parmenter | C04B 16/02 |
| 2005/0274290 A1 * | 12/2005 | Wagh | C04B 28/34 |
| | | | 106/691 |
| 2019/0226205 A1 | 7/2019 | Popp | |

FOREIGN PATENT DOCUMENTS

| | | |
|---|---|---|
| FR | 2915702 A1 | 11/2008 |
| FR | 2923242 A1 | 5/2009 |
| WO | 2002012145 A2 | 2/2002 |
| WO | 2014072533 A1 | 5/2014 |

OTHER PUBLICATIONS

Calcium Carbonate I CaCo3—PubChem; https://pubchem.ncbi.nlm.nih.gov/compound/Calcium-carbonate (Year: unknown).

Conditioning Soil With Pumice-KB Knowledge Brief, Hess Pumice, www.hesspumice.com (Year: unknown).

Gardening Know How Rockwool Growing Medium: How Tto Plant in Rockwool Cubes, https://www.gardeningknowhow.com, (Year : 2022).

Magnesium Oxide | MgO—Pubchem; https://pubchem.ncbi.nlm.nih.gov/compound/Magnesium-oxide (Year: unknown).

MMH Hempcrete Products, Michigan Medical Hemp, Spring 2020, https://mm-hemp/mmh-hempcrete.

* cited by examiner

| Organic Matter % | Phosphorus | | Potassium K ppm | Magnesium Mg ppm | Calcium Ca ppm | Sodium Na ppm | pH | | Cation Exchange Capacity meq/100g | Percent Cation Saturation | | | | |
|---|---|---|---|---|---|---|---|---|---|---|---|---|---|---|
| | Bray 1 Equiv ppm-P | Bray P2 ppm-P | | | | | Soil pH | Buffer pH | | %K | %Mg | %Ca | %H | %Na |
| 0.9 | 1 VL | | 59 L | 330 L | 6550 VH | | 8.2 | | 35.7 | 0.4 | 7.7 | 91.9 | | |

VL = VERY LOW    L = LOW    M = MEDIUM    H = HIGH    VH = VERY HIGH

FIG. 3

Mix Data

Mix Submitted By:
Supplier:
Plant:
Mix Identification:
Specified Design Strength (psi):
Design Unit Weight (pcf):
Water Cement Ratio (lb/lb):

| Material | Source | Amount | Moisture |
|---|---|---|---|

Sample Details

| | | | | Measured | Specified |
|---|---|---|---|---|---|
| Date Sampled: | 02/06/20 | Date Received: | 02/10/20 | Specification: Mix Design | |
| General Location: | 50/50 long strand | | | | |
| Sample Location: | N/A | | Slump (in): | ASTM C 143 | N/A |
| Curing Method: | Four day Field/Laboratory Cure | | Slump w/ plasticizer (in): | | N/A |
| Field Sample No.: | | Initial Cure Temp (°F) High: | Air Temp (°F): | | N/A |
| | | Low: | Concrete Temp (°F): | ASTM C 1064 | N/A |
| Contractor: | | | Air Content (%): | ASTM C 231 | N/A |
| Ticket no.: | N/A | Truck No.: | N/A | Unit Weight (pcf): | ASTM C 138 | N/A |
| Sampled By: | Client | | Volume of Density Measure (ft³): | | |
| Submitted By: | Client | | Batch Size (yd³): | Time Batched: | |
| Weather: | | | Yd³ Placed: | Time Sampled: | |
| Est. Wind (mph): | | Est. Rh (%): | Water Added (gal) Before: | Time Placed: | |
| | | | After: | Time in Truck (mins): | |

Compressive Strength

| Specimen ID | Date Tested | Age (Days) | Width (in) 1 | 2 | 3 | 4 | Height (in) 1 | 2 | 3 | 4 | Maximum Load (lbf) | Fracture Type / Remarks | Compressive Strength (psi) |
|---|---|---|---|---|---|---|---|---|---|---|---|---|---|
| 04082248-1-C1\1 | 02/10/20 | 4 | 1.88 | 2.14 | 1.93 | 2.14 | 2.65 | 2.58 | 2.63 | 2.61 | 1000 | 6 | 240 |

Average Compressive Strength (psi)

FIG. 4

SYSTEMS AND METHODS FOR SPRAYABLE HEMP-BASED COMPOSITIONS

CROSS-REFERENCE TO RELATED APPLICATIONS

This application is a continuation of U.S. Nonprovisional patent application Ser. No. 17/206,954, filed Mar. 19, 2021; which claims the priority benefit of U.S. Provisional Patent Application Ser. No. 62/992,539, filed Mar. 20, 2020, the contents of each of which are herein incorporated by reference in their entirety.

TECHNICAL FIELD

This disclosure relates generally to the field of hemp, and more specifically to the field of hemp-based compositions. Described herein are systems and methods for sprayable hemp-based compositions for achieving a fireproof, high strength, and/or insulation material that assists with construction and plumbing needs but may otherwise be used for any other building, construction, reinforcement, etc. needs.

BACKGROUND

Traditionally, in different applications, hemp-based concrete compositions have been poured into moldings or frames which are later removed and utilized as bricks or slabs after the product is hardened. This process is labor intensive resulting in higher costs, a need for more personnel, and a greater risk of potential error. Described herein are sprayable hemp-based compositions.

SUMMARY

One aspect of the present disclosure is directed to a composition comprising hemp, at least one mineral, and water. In some embodiments, the at least one mineral comprises one or more of: potassium, magnesium, calcium, or phosphorus. In other embodiments, the at least one mineral comprises one or more of: lime, hydraulic lime, or a concrete selected from the group consisting of: concrete, mortar, stucco, grout, and Portland cement. In some embodiments, pH of the minerals is between about 7 and about 10. In other embodiments, a pH of the minerals is between about 7.5 and about 8.5.

In some embodiments, an amount of potassium in the minerals is between about 25 ppm and about 100 ppm. In other embodiments, the amount of potassium in the minerals is between about 25 ppm and about 75 ppm. In further embodiments, the amount of potassium in the minerals is between about 50 ppm and about 70 ppm.

In some embodiments, an amount of magnesium in the minerals is between about 250 ppm and about 600 ppm. In other embodiments, the amount of magnesium in the minerals is between about 250 ppm and about 500 ppm. In further embodiments, the amount of magnesium in the minerals is between about 300 ppm and about 400 ppm.

In some embodiments, an amount of calcium in the minerals is between about 3,000 ppm and about 9,000 ppm. In other embodiments, the amount of calcium in the minerals is between about 4,000 ppm and about 8,000 ppm. In further embodiments, the amount of calcium in the minerals is between about 6,000 ppm and about 7,000 ppm.

In some embodiments, a v/v ratio of hemp to minerals is about 1:100 to about 1:1. In other embodiments, the v/v ratio of hemp to minerals is about 2:100 to about 1:1. In some embodiments, a percent v/v of water to the combined hemp and at least one mineral is about 1% to about 30%. In some embodiments, the hemp has a length between about 1 inch and about 5 inches. In some embodiments, the composition has an average compressive strength of about 25 PSI to about 2,500 PSI. In some embodiments, the composition has an R-value of about 2 to about 60.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

FIG. 3 depicts a mineral composition of a sprayable hemp-based composition of FIG. 1.

FIG. 4 depicts an average compressive strength of a sprayable hemp-based composition of FIG. 1.

Figure 1:
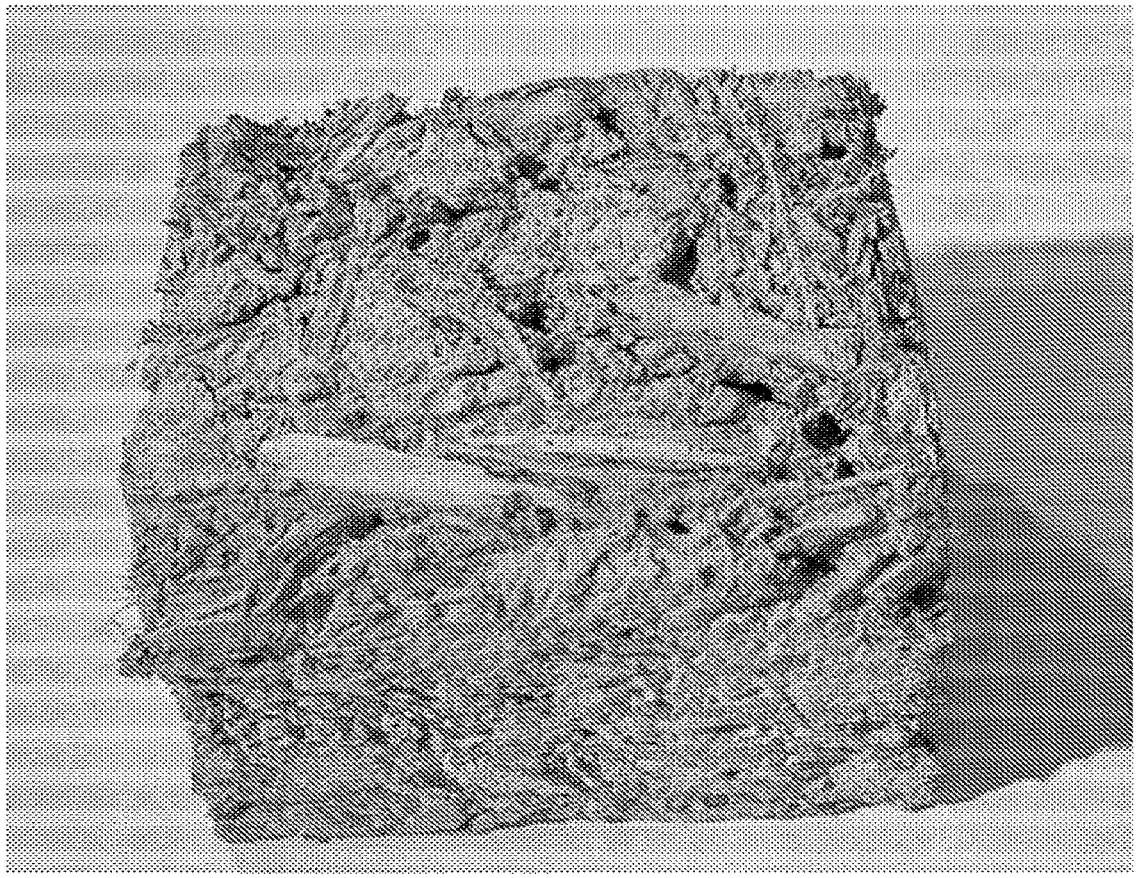
FIG. 1 depicts a photograph of one embodiment of a sprayable hemp-based composition.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Although "sprayable" compositions are described herein, one of skill in the art will appreciate that the compositions described herein may also be molded, poured, cast, or otherwise shaped or applied. Such compositions shall not be construed to be limited to spray applications.

As described herein, sprayable hemp-based concrete compositions (described herein as "hemperete") is a powerful and versatile construction material. Hemperete can offer reliable structural support, powerful insulation, and fire-resistant properties while being far more carbon neutral than purely mineral materials, but it is traditionally difficult to work with. As discussed above, hemperete has historically been poured into molds or frames to form bricks or slabs that are installed upon curing, a process which has limited the material's adoption in broad construction use. The sprayable material described herein retains hemperete's general advantageous properties while dramatically improving its workability by enabling its application with standard material sprayer devices. This both expands the range of uses for hemperete and decreases its labor costs. Across numerous embodiments described herein, the sprayable hemperete can function in a variety of roles, including, but not limited to, as an interior insulation and as an exterior surface, as well as for more niche uses such as a custom insulation coating for pipes and plumbing.

Preparation of Hemp.

Industrial hemp (a cultivar of the species *Cannabis sativa*) is chopped while in the field; then the cannabinoids in the hemp are extracted. This resulting hemp product (i.e., hemp hurds or shives) is then milled (e.g., with a hammer mill, a chopper, or a grinder) to proper length based upon the desired end product. The proper length of the hemp may be substantially or about 0.5 inches to about 10 inches; about 1 inch to about 10 inches; about 1 inch to about 5 inches; about 2 inches to about 9 inches; about 2.5 inches to about 8.5 inches; about 4 inches to about 6 inches; about 5 inches to about 10 inches; about 4 inches to about 9 inches; about 3 inches to about 8 inches; about 0.5 inches to about 2 inches, etc. For applications wherein the hemperete will be hidden by exterior surfaces (e.g., as interior insulation), a "coarser" or longer hemp length can be used such as, but not limited to, from about 2 inches to about 6 inches, from about 2 inches to about 4.5 inches, and from about 2 inches to about 3 inches. For applications wherein the hemperete will be the visible top exterior surface (e.g., as a wall or floor surface), a "finer" or shorter hemp length can be used, such as, but not limited to, from about 0.5 inches to about 2 inches, and from about 0.5 inches to about 1 inch.

In any of the compositions described herein, the hemp can be wet hemp (i.e., plant product that has not undergone any procedure to remove or substantially reduce its water content). In alternative embodiments, the hemp can be dry hemp. In various embodiments, dry hemp can be plant product (e.g., hemp hurds or shrives) that has been dried according to a variety of procedures to remove or substantially reduce its water content. Techniques to dry hemp can include, but are not limited to, sun drying or with a hemp or other plant drier apparatus.

Compositions.

In some embodiments, as shown in FIG. 1 and FIG. 3 (the results of a soil test performed on a hemp-based composition for the measurement of various chemical elements), a composition includes: hemp; at least one mineral; and water. For example, the at least one mineral comprises one or more of: potassium, magnesium, calcium, and a combination thereof. In other embodiments, the minerals comprise all three of potassium, magnesium, and calcium. In further embodiments, the minerals additionally comprise phosphorus. The one or more of potassium, magnesium, calcium, and phosphorus minerals can be provided from a variety of sources in many embodiments. In many embodiments, the calcium minerals are calcium oxides with or without calcium carbonate. In alternative embodiments, other minerals containing calcium can be employed. In some embodiments, the magnesium minerals are magnesium oxides with or without magnesium carbonates; although in alternative embodiments, other minerals containing magnesium can be employed. In some embodiments, the potassium minerals are potassium silicates; although other minerals containing potassium can be employed in alternative embodiments. In some embodiments, the phosphorus compounds employed are various phosphorus oxides (e.g., phosphorus pentoxide); although other minerals and compounds containing phosphorus can be employed in alternative embodiments. In other embodiments, the minerals comprise lime. In still other embodiments, the minerals comprise hydraulic lime. In still other embodiments, the minerals comprise cement comprising one or more of: concrete, mortar, stucco, grout, or a combination thereof (e.g., Portland cement).

In any of the preceding compositions, a pH of the at least one mineral is between about 7 to about 11, about 7 to about 10; about 8 to about 9; about 8 to about 11; about 6 to about 9; about 7.5 to about 9; about 7.5 to about 8.5; etc.

In any of the preceding compositions, an amount of potassium in the minerals is between about 25 ppm to about 100 ppm, about 25 ppm to about 75 ppm; about 55 ppm to about 65 ppm; about 50 ppm to about 60 ppm; about 50 ppm to about 70 ppm; about 50 ppm to about 100 ppm; about 45 ppm to about 75 ppm; etc.

In any of the preceding compositions, an amount of magnesium in the minerals is between about 250 ppm to about 600 ppm; about 250 ppm to about 500 ppm; about 300 ppm to about 400 ppm; about 200 ppm to about 600 ppm; about 325 ppm to 375 ppm; etc.

In any of the preceding compositions, an amount of calcium in the minerals is between about 6,000 ppm to about 7,000 ppm; about 3,000 ppm to about 9,000 ppm; about 4,000 ppm to about 8,000 ppm; about 6,250 ppm to about 6,750 ppm; etc.

In any of the preceding compositions, an amount of phosphorus in the minerals can be about 0 ppm to about 10 ppm as measured by the Bray-P1 method for performing soil tests. In further embodiments, an amount of phosphorus in the minerals can be about 0 ppm to about 5 ppm as measured by the Bray-P1 method. In still further embodiments, the amount of phosphorus in the minerals can be about 1 ppm as measured by the Bray-P1 method.

In some embodiments, the composition can be about 25 ppm to about 100 ppm of potassium, about 250 ppm to about 600 ppm of magnesium, and about 3,000 ppm to about 9,000 ppm of calcium. In other embodiments, the composition can be about 25 ppm to about 75 ppm of potassium, about 250 ppm to about 500 ppm of magnesium, and about 4,000 ppm to about 8,000 ppm of calcium. In other embodiments, the composition can be about 50 ppm to about 70 ppm of potassium, about 300 ppm to about 400 ppm of magnesium, and about 6,000 ppm to about 7,000 ppm of calcium. In still further embodiments, the composition can be about 59 ppm of potassium, about 330 ppm of magnesium, and about 6550 ppm of calcium. In still further embodiments, the composition can be about 59 ppm of potassium, about 330 ppm of magnesium, about 6550 ppm of calcium, and about 1 ppm of phosphorus as measured by the Bray-P1 method.

In any of the preceding compositions, the v/v ratio of hemp to minerals (e.g., calcium, magnesium, potassium, phosphorus, lime, hydraulic lime, cement or Portland cement, etc.) is about 1:100 to about 1:1; about 2:100 to about 1:1; about 5:100 to about 1:1; about 25:100 to about 1:1; about 50:100 to about 1:1; about 75:100 to about 1:1; etc. In other embodiments, still other ratios can be used, both as w/w and v/v proportions.

In any of the preceding compositions, the percent v/v of water to the combined hemp and minerals is about 1% to about 30%; about 5% to about 30%; about 10% to about 20%; about 15% to about 30%; about 15% to about 25%; about 2.5% to about 10%; etc. In some embodiments, the percent v/v of water is dependent on the use case for the composition. For example, a higher percent v/v of water may be used for spray insulation applications (e.g., pipe wrap insulation), while a lower percent v/v of water may be used for wall formation applications, for example within frames or molds. In some embodiments, the composition can have a slump (as measured with a standard slump cone as appreciated by those of skill in the art) of about 0 mm to about 12 mm. In other embodiments, the composition can have a slump of about 0 mm to about 10 mm. In further embodiments, the composition can have a slump of about 0 mm to about 5 mm. In still further embodiments, the composition can have a slump of about 0 mm to about 1 mm. In additional embodiments, the composition can have a slump of about 5 mm to about 10 mm.

Application of Composition.

As described elsewhere herein, in some embodiments, a hemp-based composition may be sprayed or otherwise deposited onto a surface or into an at least partially enclosed receptable to form a hardened or solid end product. The composition is configured to pass through an orifice of the sprayer nozzle. The spray equipment applies pressure to the composition which allows the composition to be sprayed and applied to a desired surface or area. Examples of a commercial spraying machine that can be used include an IMEER Silent 300 Pumping/Spraying/Mixing Machine.

Curing Process.

After application or deposition of the composition, the composition is cured or hardened by, for example, natural evaporation of water in the composition; application of heat, for example via an external device; application of ultraviolet light; or any other method known to one of skill in the art. In some embodiments, one or more heated water coils may be embedded into the composition after spraying, pouring, or otherwise applying the composition to expedite the curing process.

Composition Characteristics and Features.

Depending on the sequence of the spray machine, any of the compositions described herein can be sprayed or otherwise applied at a rate of about 10,000 square feet to about 30,000 square feet per hour; about 5,000 square feet to about 25,000 square feet per hour; about 5,000 square feet to about 20,000 square feet per hour; about 15,000 square feet to about 25,000 square feet per hour; about 18,000 square feet to about 23,000 square feet per hour; etc. Depending on the surface that the composition is being applied to, a percent volume/volume water may be adjusted to capture the correct slump for the application. In some embodiments, any of the compositions described herein may serve as a replacement for building materials, such as, for example, stucco and dry wall. In some embodiments, any of the compositions described herein may replace spray foam that is applied inside a wall for insulation. In some embodiments, any of the compositions described herein may serve as "pipe wrap," for example as pipe insulation.

Figure 2:
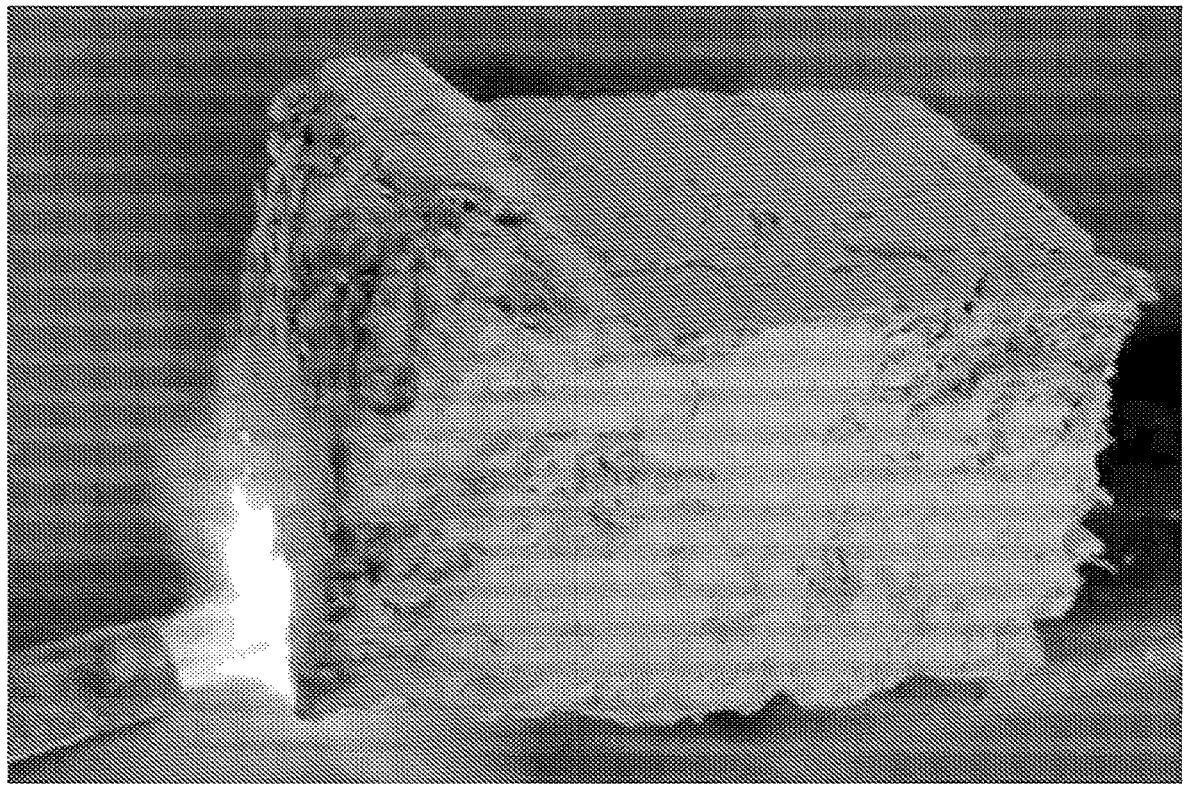
FIG. 2 depicts a photograph of the fire resistant properties of the sprayable hemp-based composition of FIG. 1.

In some embodiments, any of the compositions described herein may have a volatile organic compound (VOC) level of about or substantially zero. In some embodiments, the composition can have a VOC level less than or equal to about 10 ppm. In other embodiments, the composition can have a VOC level less than or equal to about 1 ppm. In still other embodiments, the composition can have a VOC level less than or equal to about 0.5 ppm. In some embodiments, any of the compositions described herein may have a carbon footprint of about or substantially zero. In some embodiments, any of the compositions described herein may have an average compressive strength of about 25 PST to about 5,000 PSI; about 25 PSI to about 2,500 PSI; about 50 PSI to about 5,000 PSI; about 100 PSI to about 1,000 PSI; about 100 PSI to about 500 PSI, about 1,000 to about 2,500 PSI; about 2,000 PSI to about 3,000 PSI; about 2,500 PSI to about 5,000 PSI; about 1,500 PSI to about 3,000 PSI; about 1,500 PSI to about 2,500 PSI; etc. A non-limiting example of an average compressive strength of a hemp-based composition is shown in FIG. 4. In this non-limiting example, the material expressed a compressive strength of 240 PSI. This demonstrates a marked improvement over standard insulation materials, which have an average compressive strength of about 30 PSI. In some embodiments, any of the compositions described herein may have an R-value of about or substantially 2 to about 60. This demonstrates a marked improvement over standard concrete, which generally scores an R-value of about 1.98. In some embodiments, any of the compositions described herein may be fire resistant, as measured by an American Society for Testing and Materials (ASTM) 84-19B Test or similar test (e.g., ASTM 84-19A, ASTM 84-20, etc.). In other embodiments, the hemp-based compositions can score from about 0 to about 1 on the ATSM 84-19B Test. In some embodiments, the hemp-based composition scores a zero (0) on the ASTM 84-19B Test, which is a perfect score indicating maximal fire resistance according to the test. A non-limiting example of a fire-resistant hemp-based composition is shown in FIG. 2. In some embodiments, any of the compositions described herein are biodegradable.

As used in the description and claims, the singular form "a", "an" and "the" include both singular and plural references unless the context clearly dictates otherwise. For example, the term "mineral" may include, and is contemplated to include, a plurality of minerals. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of applying a sprayable hemp-based concrete composition, the method comprising:
spraying a hemp-based concrete composition on a surface, the hemp-based concrete composition comprising:
hemp,
at least one mineral, and water, wherein a v/v ratio of hemp to mineral(s) is from 1:100 to 1:1.

2. The method of claim 1, wherein the surface is an exterior surface of a building.

3. The method of claim 1, wherein the surface is an interior surface of a building.

4. The method of claim 1, wherein the surface is a pipe surface for pipe insulation.

5. The method of claim 1, further comprising curing the hemp-based concrete composition.

6. The method of claim 5, further comprising applying heat to cure the hemp-based concrete composition.

7. The method of claim 5, further comprising applying ultraviolet light to cure the hemp-based concrete composition.

8. The method of claim 5, further comprising embedding one or more coils in the hemp-based concrete composition, wherein the one or more coils are configured to receive heated water therethrough.

9. The method of claim 5, further comprising determining an average compressive strength of the cured hemp-based concrete composition to be about 25 PSI to about 2,500 PSI.

10. The method of claim 5, further comprising determining an R-value of the cured hemp-based concrete composition to be about 2 to about 60.

11. The method of claim 1, further comprising spraying the hemp-based concrete composition at a rate of about 10,000 square feet to about 30,000 square feet per hour.

12. The method of claim 1, further comprising spraying the hemp-based concrete composition at a rate of about 5,000 square feet to about 25,000 square feet per hour.

13. The method of claim 1, further comprising spraying the hemp-based concrete composition at a rate of about 15,000 square feet to about 25,000 square feet per hour.

14. The method of claim 1, further comprising spraying the hemp-based concrete composition at a rate of about 18,000 square feet to about 23,000 square feet per hour.

15. The method of claim 1, wherein a percent v/v of water to the hemp and the at least one mineral is about 15% to about 25%.

16. The method of claim 1, further comprising determining a slump of the hemp-based concrete composition to be about 0 mm to about 12 mm.

17. The method of claim 1, wherein the at least one mineral comprises one or more of: potassium, magnesium, calcium, or phosphorus.

18. A method of applying a sprayable hemp-based concrete composition, the method comprising: spraying a hemp-based concrete composition on a surface, the hemp-based concrete composition comprising: hemp, at least one mineral, and water;
wherein the at least one mineral comprises one or more of: potassium, magnesium, calcium, or phosphorus; and
wherein an amount of potassium in the at least one mineral is between about 25 ppm and about 100 ppm.

19. A method of applying a sprayable hemp-based concrete composition, the method comprising: spraying a hemp-based concrete composition on a surface, the hemp-based concrete composition comprising: hemp, at least one mineral, and water;
wherein the at least one mineral comprises one or more of: potassium, magnesium, calcium, or phosphorus; and
wherein an amount of magnesium in the at least one mineral is between about 250 ppm and about 600 ppm.

20. A method of applying a sprayable hemp-based concrete composition, the method comprising: spraying a hemp-based concrete composition on a surface, the hemp-based concrete composition comprising: hemp, at least one mineral, and water;
wherein the at least one mineral comprises one or more of: potassium, magnesium, calcium, or phosphorus; and
wherein an amount of calcium in the at least one mineral is between about 3,000 ppm and about 9,000 ppm.

21. The method of claim 1, wherein the hemp-based concrete composition further comprises one or more of: lime, hydraulic lime, concrete, mortar, stucco, grout, or Portland cement.

22. The method of claim 1, wherein a pH of the at least one mineral is between about 7 and about 10.

23. The method of claim 1, wherein a pH of the at least one mineral is between about 7.5 and about 8.5.

24. The method of claim 1, wherein a v/v ratio of the hemp to the at least one mineral is about 1:100 to about 1:1.

25. The method of claim 1, wherein a v/v ratio of the hemp to the at least one mineral is about 2:100 to about 1:1.

* * * * *